(12) United States Patent
Dietl et al.

(10) Patent No.: US 6,566,430 B2
(45) Date of Patent: May 20, 2003

(54) CURABLE ORGANOPOLYSILOXANE COMPOSITIONS

(75) Inventors: Stefan Dietl, Burghausen (DE); Walter Strassberger, Altoetting (DE); Anita Kaltenberger, Burghausen (DE); Mathias Miedl, Polling (DE); Philipp Mueller, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/013,146

(22) Filed: Dec. 10, 2001

(65) Prior Publication Data

US 2002/0111426 A1 Aug. 15, 2002

(30) Foreign Application Priority Data

Dec. 14, 2000 (DE) .......................................... 100 62 181

(51) Int. Cl.[7] ....................... C08K 5/5419; C08G 77/08; C08L 83/07
(52) U.S. Cl. ....................... 524/268; 502/152; 502/213; 524/430; 524/431; 524/432; 528/15; 528/31; 528/32; 252/602
(58) Field of Search ................................. 502/152, 213; 524/268, 430, 431; 528/15, 31, 32; 252/602

(56) References Cited

U.S. PATENT DOCUMENTS

| | | | |
|---|---|---|---|
| 5,008,317 A | | 4/1991 | Wolfer et al. |
| 5,025,073 A | * | 6/1991 | Lewis et al. ................... 528/15 |
| 5,362,315 A | | 11/1994 | Muller-Rees et al. |
| 5,432,140 A | * | 7/1995 | Sumpter et al. ............. 502/167 |
| 5,910,525 A | * | 6/1999 | Matsushita et al. ......... 524/267 |
| 6,187,890 B1 | | 2/2001 | Fehn et al. |
| 6,252,028 B1 | | 6/2001 | Fehn et al. |
| 6,359,098 B1 | * | 3/2002 | Fehn et al. ................... 528/15 |

FOREIGN PATENT DOCUMENTS

| | | |
|---|---|---|
| DE | 38 31 478 A1 | 3/1990 |
| DE | 199 38 338 A1 | 2/2001 |
| EP | 0 088 624 B1 | 9/1983 |
| EP | 0 359 252 A2 | 3/1990 |
| EP | 0 627 467 A1 | 12/1994 |
| EP | 0 822 230 A2 | 2/1998 |
| EP | 0 822 231 A2 | 2/1998 |
| EP | 0 982 370 A1 | 7/1999 |
| EP | 0 994 159 A1 | 9/1999 |
| EP | 0 982 370 A1 | 3/2000 |
| EP | 0 994 159 A1 | 4/2000 |

OTHER PUBLICATIONS

English Derwent Abstract AN 2000–206997[19] Corresponding To EP 982 370.
English Derwent Abstract AN 2000–319924[28] Corresponding To EP 994 159.
English Derwent Abstract AN 1990 085070[12] Corresponding To DE 38 31 478.
English Derwent Abstract AN 2001 283482[30] Corresponding To DE 199 38 338 A1.
J. Chem. Soc. (C) 1967, pp. 1364–1366.

* cited by examiner

*Primary Examiner*—Robert Dawson
*Assistant Examiner*—Marc Zimmer
(74) *Attorney, Agent, or Firm*—Brooks & Kushman P.C.

(57) ABSTRACT

Compositions prepared by mixing
(A) 50–90 wt % of organopolysiloxane having a viscosity of from 50 to 100·10$^6$ mm$^2$/s at 25° C.,
(B) 10–50 wt % of a metal oxide from the group consisting of titanium oxide, zirconium dioxide, zinc oxide, cerium(III) and cerium(IV) oxide,
(C) 0.3–5 wt % of organosilicon compound containing basic nitrogen bound to silicon via carbon,
(D) 0.05–0.5 wt % of platinum calculated as the element, in the form of a bis(alkynyl)platinum complex which additionally includes donor ligands, and
(E) from 0 to 5 wt %, preferably 0 wt %, of further components, the sum of the percentages chosen within each of the ranges specified under (A) to (E) being 100 wt %, and the wt % in each case being based on the total weight of the additive, are highly suitable as additives to crosslinkable organosilicon compositions, providing one or more of improved tracking resistance, high arc resistance, and decreased flammability.

16 Claims, No Drawings

CURABLE ORGANOPOLYSILOXANE COMPOSITIONS

BACKGROUND OF THE INVENTION

1. Field of the Invention

The present invention relates to crosslinkable silicone compositions useful for preparing organopolysiloxane elastomers exhibiting low flammability and/or high tracking resistance as well as high arc resistance. The present invention further relates to a method of preparing such preparations, additives employed for this purpose, and to molded articles prepared from crosslinkable preparations containing these compositions.

2. Background Art

Non-tracking, low-flammability, arc-resistant organopolysiloxane elastomers are already known, and are obtained e.g. by the addition of metal oxides, especially metal oxidyhydrates, or by the addition of platinum compounds, optionally in combination with metal oxides and organosilicon compounds. In this context, reference can be made, for example, to EP-B 088624 and DE-A 38 31 478.

It is known to induce crosslinking of crosslinkable silicone composition compounds which form free radicals, for example acyl peroxides, alkyl peroxides and aryl peroxides, by means of condensation, by high-energy radiation, and by the addition of Si-bound hydrogen to aliphatic carbon—carbon multiple bonds ("addition crosslinking"). Addition-crosslinking, curable organopolysiloxane preparations are commercially available as 2-component systems or as 1-component systems. The shelf life of the addition-crosslinking, low-flammability, non-tracking 1-component systems mentioned in DE-A 3831478 is only a few days at room temperature, as the crosslinking reaction proceeds noticeably even at room temperature. While it is possible to extend pot life at will via the type and level of the added inhibitors, a longer pot life inevitably entails impaired crosslinking behavior, characterized, for example, by a low crosslinking rate, by incomplete crosslinking, etc.

SUMMARY OF THE INVENTION

The present invention relates to compositions comprising an admixture of (A) 50–90 wt % of an organopolysiloxane having a viscosity of from 50 to $100 \cdot 10^6$ mm$^2$/s at 25° C.;

(B) 10–50 wt % of one or more of titanium oxide, zirconium dioxide, zinc oxide, cerium(III) and cerium (IV) oxide;

(C) 0.3–5 wt % of an organosilicon compound containing basic nitrogen bound to silicon via carbon;

(D) 0.05–0.5 wt % of platinum, calculated as the element, in the form of a bis(alkynyl)platinum complex which additionally includes donor ligands; and (E) from 0 to 5 wt %, and preferably 0 wt %, of further components, the sum of the percentages chosen within each of the ranges specified hereinabove under (A) to (E) being 100 wt %, and the wt % in each case being based on the total weight of the component.

The compositions may be used as such, but are preferably used in minor amounts as an additive to produce non-tracking and/or high arc resistance and/or low flammability elastomers.

DETAILED DESCRIPTION OF THE PREFERRED EMBODIMENT(S)

The component (A) of the composition according to the invention can be any organopolysiloxane which is suitable for admixing with components (B) to (D) employed according to the invention. Component (A) is preferably an essentially linear diorganopolysiloxane terminated by triorganylsilyl groups, the organyl groups preferably being alkyl and alkenyl groups, most preferably alkyl groups. Examples of the alkyl groups are those specified below for radical R, the methyl radical being preferred. Examples of alkenyl groups are those specified below for radical R, the vinyl radical being preferred. The component (A) employed according to the invention can optionally, in addition to the diorganylsiloxane units, comprise further siloxane units such as monoorganosiloxy units or $SiO_{4/2}$ units.

The organopolysiloxane (A) preferably has a viscosity of from 500 to $20 \cdot 10^6$ mm$^2$/s, most preferably from 500 to 100,000 mm$^2$/s, in each case measured at 25° C. The organopolysiloxane (A) may be a single organopolysiloxane or a mixture of organopolysiloxanes.

The component (B), employed to achieve tracking resistance and arc resistance, is preferably titanium dioxide or zirconium dioxide only, whereas any of the abovementioned metal oxides can be used to achieve low flammability. Most preferably, the component (B) comprises titanium dioxide and zirconium dioxide, thereby preferentially affording organopolysiloxane elastomers which have both low flammability and high tracking resistance and arc resistance.

The metal oxides (B) preferably have a specific surface area (in accordance with BET), of from 5 to 60 m$^2$/g, more preferably from 40 to 60 m$^2$/g. Titanium dioxide is, in particular, fumed titanium dioxide prepared in the gas phase.

The organosilicon compounds (C) containing basic nitrogen bound to silicon via carbon are preferably those selected from units of the formula

$$Y_a R_b (OR^1)_c SiO_{(4-a-b-c)/2} \tag{I},$$

where

R are identical or different and represent univalent hydrocarbon radicals having from 1 to 8 carbon atoms per radical, $R^1$ are identical or different and represent alkyl groups having from 1 to 4 carbon atoms per radical, Y are identical or different and represent univalent SiC-bound organic radicals containing basic nitrogen, a is 0, 1, 2 or 3, b is 0, 1, 2 or 3, c is 0, 1, 2 or 3, with the proviso that the sum a+b+c≦4, and that the organosilicon compound comprises at least one unit where a differs from 0 and contains at most 10 silicon atoms.

The organosilicon compounds (C) employed according to the invention can either be silanes, i.e. compounds of formula (I) with a+b+c≦4, or siloxanes, i.e. compounds comprising units of formula (I) with a+b+c≦3. Preferably, the organosilicon compounds employed according to the invention are silanes.

Examples of hydrocarbon radicals R include alkyl radicals such as the methyl, ethyl, n-propyl, isopropyl, 2-ethylhexyl radical and butyl radicals; alkenyl radicals such as the vinyl and allyl radicals; cycloaliphatic hydrocarbon radicals such as cyclopentyl, cyclohexyl, and methylcyclohexyl radicals; aromatic hydrocarbon radicals such as the phenyl radical and xylyl radicals; alkaryl radicals such as tolyl radicals; and aralkyl radicals such as the benzyl radical.

Preferably, however, the hydrocarbon radicals R, especially if they are bound to silicon atoms to which basic nitrogen is likewise bound via carbon, are free from aliphatic multiple bonds, the radical R most preferably being the methyl radical.

Examples of radical $R^1$ are the alkyl radicals specified for radical R, methyl and ethyl radicals being preferred.

The radicals Y are preferably those of the formula $$R^{10}NHR^{11}— \quad (II),$$

where $R^{10}$ represents hydrogen, alkyl or cycloalkyl or aminoalkyl radicals having from 1 to 8 carbon atoms per radical, and $R^{11}$ represents divalent hydrocarbon radicals free from an aliphatic multiple bond and having one carbon atom or 3 or 4 carbon atoms per radical.

The radical $R^{11}$ in particular is the radical —$(CH_2)_3$—.

Examples of radical $R^{10}$ are the cycloalkyl radicals specified for radical R and $H_2N(CH_2)_3$—, $H_2N(CH_2)_2NH(CH_2)_2$—, $H_2N(CH_2)_2$—, $(H_3C)_2NH(CH_2)_2$—, $H_2N(CH_2)_4$—, $H(NHCH_2CH_2)_3$— and $C_4H_9NH(CH_2)_2NH(CH_2)_2$—.

Preferably employed as organosilicon compounds (C) comprising basic nitrogen bound to silicon via carbon are N-(2-aminoalkyl)-3-aminopropyltrimethoxysilane, N-(2-aminoethyl)-3-aminopropyltriethoxysilane, N-(2-aminoethyl)-3-aminopropylmethyldimethoxysilane, 3-aminopropyltriethoxysilane, N-(cyclohexyl)-3-aminopropyltrimethoxysilane, N-(2-aminoethyl)-3-aminopropyl-tris(trimethylsiloxy)silane and 1,2-bis[N-(2-aminoethyl)-3-aminopropyl]-1,1,2,2-tetramethyldisiloxane, particular preference being given to the use of N-(2-aminoethyl)-3-aminopropyltrimethoxysilane.

Preferably, the component (D) employed according to the invention represents those bis(alkynyl)platinum complexes which include phosphane groups or diene radicals as donor ligands.

Examples of the component (D) employed according to the invention include a) bis(alkynyl)bis(phosphane) platinum compounds, selected from the group consisting of

$$(PR^{2''}{}_3)_2Pt(—C≡C—R^{3''})_2 \quad (III),$$

$$(R^{2''}{}_2P—R^{4''}—PR^{2''}{}_2)Pt(—C≡C—R^{3''})_2 \quad (IV),$$

and $$H—C≡C—R^{5''}—C≡C—[Pt(PR^{2''}{}_3)_2—C≡C—R^{5''}—C≡C—]_e—H \quad (V),$$

where $R^{2''}$ are identical or different and represent univalent, optionally substituted hydrocarbon radicals having from 1 to 24 carbon atoms, halogen atoms, hydrogen atoms, hydroxyl radicals, —CN or —SCN, which are bound to phosphorus either directly or via oxygen, nitrogen or sulfur, $R^{3''}$ are identical or different and represent univalent, optionally substituted hydrocarbon radicals having from 1 to 24 carbon atoms, $R^{4''}$ are identical or different and represent divalent, optionally substituted hydrocarbon radicals having from 1 to 14 carbon atoms, $R^{5''}$ are identical or different and represent divalent, optionally substituted hydrocarbon radicals having from 1 to 24 carbon atoms and e represents an integer greater than or equal to 1.

If the radicals $R^{2''}$, $R^{3''}$, $R^{4''}$ and $R^{5''}$ are substituted hydrocarbon radicals, the preferred substituents are halogen atoms such as F, Cl, Br and I, cyano radicals and groups —$OR^{6''}$, where $R^{6''}$ are identical or different and represent a hydrogen atom or a univalent hydrocarbon radical having from 1 to 20 carbon atoms.

The compounds described in the formulae (III) to (V) are known. Reference can be made, for example, to EP-A 982 370, which is incorporated by reference, in particular, paragraphs [0036] to [0043].

The bis(alkynyl)bis(phosphane)platinum compounds employed according to the invention preferably are bis(alkynyl)bis(triphenylphosphane)platinum complexes, particular preference being given to trans-$(Ph_3P)_2$ Pt[—C≡CC$_6$H$_{10}$(OH)]$_2$, trans-$(Ph_3P)_2$Pt[—C≡C—Ph]$_2$ and trans-$(Ph_3P)_2$Pt(—C≡C—SiMe$_3$)$_2$ with Me being the methyl radical and Ph being the phenyl radical.

Further examples of component (D) employed according to the invention are b) bis(alkynyl)(η-olefin)platinum compounds selected from the group consisting of

(VI)

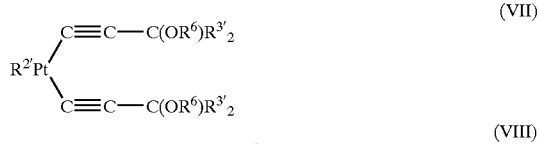

(VII)

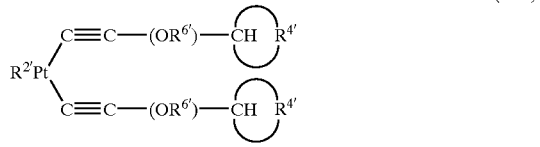

(VIII)

and

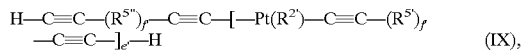

$$H—C≡C—(R^{5''})_f—C≡C—[—Pt(R^{2'})—C≡C—(R^{5'})_f—C≡C—]_{e'}—H \quad (IX),$$

where $R^{2'}$ individually represent an optionally substituted diene which is linked to platinum via at least one π-bond, an unbranched or branched chain having from 4 to 12 carbon atoms, or a cyclic ring having from 6 to 18 carbon atoms, $R^{3'}$ are identical or different and represent a hydrogen atom, halogen atom, or a univalent hydrocarbon radical optionally substituted by halogen atom(s) or cyano radical(s) and having from 1 to 24 carbon atoms, $R^{5'}$ are identical or different and represent divalent, optionally substituted hydrocarbon radicals having from 1 to 12 carbon atoms, silane radicals, or siloxane radicals, $R^{6'}$ are identical or different and are a hydrogen atom or a univalent hydrocarbon radical having from 1 to 20 carbon atoms, e' represents an integer greater than or equal to 1, and f' is 0 or 1.

If $R^{2'}$ is a substituted diene or the radicals $R^{4'}$ and $R^{5'}$ are substituted hydrocarbon radicals, the preferred substituents are halogen atoms such as F, Cl, Br and I, cyano radicals, —$NR^{6'}{}_2$ and groups —$OR^{6'}$, where $R^{6'}$ has the abovementioned meaning.

The radical $R^{2'}$ preferably represents 1,5-cyclooctadiene, 1,5-dimethyl-1,5-cyclooctadiene, 1,6-dimethyl-1,5-cyclooctadiene, 1-chloro-1,5-cyclooctadiene, 1,5-dichloro-1,5-cyclooctadiene, 4-vinyl-1-cylcohexene, and $\eta^4$-1,3,5,7-cyclo-octatetraene, of which 1,5-cyclooctadiene, 1,5-dimethyl-1,5-cyclooctadiene, 1,6-dimethyl-1,5-cyclooctadiene are particularly preferred.

The radical $R^{3'}$ preferably represents a hydrogen atom or hydrocarbon radicals having from 1 to 8 carbon atoms, of which methyl, ethyl, cyclohexyl and phenyl radicals are particularly preferred.

The radical $R^{4'}$ preferably represents divalent hydrocarbon radicals having from 1 to 12 carbon atoms, e.g. $-CH_2-$, $-C_2H_4-$, $-C_4H_8-$, $-C_5H_{10}-$ and $-C_8H_{16}-$, of which $-C_5H_{10}-$ is particularly preferred.

The radical $R^{5'}$ preferably represents $-CH_2-$, $-C_2H_4-$, $-C_3H_6-$, $-C_4H_8-$, $-C_5H_{10}-$, $-C_6H_4-$, $-C_8H_{16}-$, $-CH_2-N(H)-CH_2-$, $-CH_2-O-CH_2-$, $-Si(CH_3)_2-$, $-Si(CH_3)_2[-O-Si(CH_3)_2]_p-$ and $-C_6H_4-Si(CH_3)_2[-O-Si(CH_3)_2]_p-C_6H_4-$, where p represents identical or different integers from 1 to 6,000.

$R^{6'}$ preferably represents a hydrogen atom, an alkyl radical or an aryl radical, of which the hydrogen atom, the methyl radical and the ethyl radical are particularly preferred.

The compounds described in the formulae (VI) to (IX) are already known. Reference can be made, for example, to EP-A 994 159, which is incorporated by reference, in particular, paragraphs [0036] to [0046].

The bis(alkynyl)(η-olefin)platinum compounds of type b) employed according to the invention preferably are bis(alkynyl)(1,5-cyclooctadiene)platinum, bis(alkynyl)(1,5-dimethyl-1,5-cycloctadiene)platinum and bis(alkynyl)(1,6-dimethyl-1,5-cyclooctadiene)platinum complexes.

Further examples of the component (D) employed according to the invention are c) bis(alkynyl)(η-olefin)platinum compounds, selected from the group consisting of compounds of formula (X)

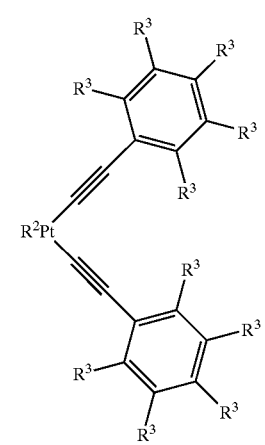

and/or oligomeric or polymeric compounds composed of structural units of the general formula (XI)

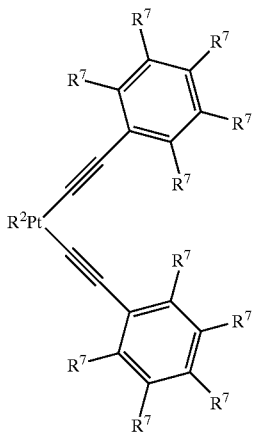

and optionally structural units of the general formula $$R^9_rSiO_{(4-r)/2} \qquad (XII),$$

where
  $R^2$ represents an optionally substituted diene which is bound to platinum via at least one π-bond and constitutes an unbranched or branched chain having from 4 to 18 carbon atoms or a cyclic ring having from 6 to 28 carbon atoms,
  $R^3$ are identical or different and represent a hydrogen atom, a halogen atom, $-SiR^4_3$, $-OR^6$ or a univalent, optionally substituted hydrocarbon radical having from 1 to 24 carbon atoms, with the proviso that in the compounds of formula (X) at least one radical $R^3$ is $-SiR^4_3$,
  $R^4$ are identical or different and represent hydrogen, a halogen atom, $-OR^6$ or a univalent, optionally substituted hydrocarbon radical having from 1 to 24 carbon atoms,
  $R^6$ identical or different and represent a hydrogen atom, $-SiR^4_3$ or a univalent, optionally substituted hydrocarbon radical having from 1 to 20 carbon atoms,
  $R^7$ are identical or different and represent a hydrogen atom, a halogen atom, $-SiR^4_3$, $-SiR^4_{(3-t)}[R^8SiR^9_sO_{(3-s)/2}]_t$, $-OR^6$ or a univalent, optionally substituted hydrocarbon radical having from 1 to 24 carbon atoms, with the proviso that in formula (VI) at least one radical $R^7$ has the meaning $-SiR^4_{(3-t)}[R^8SiR^9_sO_{(3-s)/2}]_t$,
  $R^8$ are identical or different and represent oxygen or a divalent, optionally substituted hydrocarbon radical having from 1 to 24 carbon atoms, which can optionally be bound to silicon via an oxygen atom,
  $R^9$ are identical or different and represent hydrogen or an organic radical,
  r is 0, 1, 2 or 3,
  s is 0, 1, 2 or 3, and
  t is 1, 2 or 3.

If $R^2$ is a substituted diene, or if the radicals $R^3$, $R^4$, $R^6$, $R^7$ and $R^8$ are substituted hydrocarbon radicals, preferred substitutents are halogen atoms such as F, Cl, Br, and I, cyano radicals, $-NR^6_2$, heteroatoms such as O, S, N and P, and groups $-OR^6$, where $R^6$ has the abovementioned meaning.

The diene $R^2$ is preferably 1,5-cyclooctadiene, 1,5-dimethyl-1,5-cyclooctadiene, 1,6-dimethyl-1,5- cyclooctadiene, 1-chloro-1,5-cyclooctadiene, 1,5-dichloro-1,5-cyclooctadiene, 1,8-cyclotetradecadiene, 1,9-cyclohexadecadiene, 1,13-cyclotetracosadiene, bicyclo [2.2.1]hepta-2,5-diene, 4-vinyl-1-cyclohexene, and $\eta^4$-1,3,5,7-cyclooctatetraene, of which 1,5-cyclooctadiene, bicyclo [2.2.1]hepta-2,5-diene, 1,5-dimethyl-1,5-cyclo octadiene, 1,6-dimethyl-1,5-cyclooctadiene are particularly preferred.

The radical $R^3$ preferably represents a hydrogen atom, a hydroxy, a methoxy radical, or a hydrocarbon radical having from 1 to 8 carbon atoms, and also a trimethylsilyl, ethyldimethylsilyl, butyldimethylsilyl, or octyldimethylsilyl radical, of which the hydrogen atom, the methyl radical and the trimethylsilyl radical are particularly preferred.

The radical $R^4$ preferably represents a univalent hydrocarbon radical having from 1 to 24 carbon atoms, for example those mentioned in connection with radical $R^3$, a substituted hydrocarbon radical such as the hydroxypropyl and chloropropyl radicals, and $—OR^6$ radicals such as hydroxy, methoxy and ethoxy radicals, of which methyl, ethyl, butyl, octyl, methoxy, ethoxy and hydroxypropyl radicals are particularly preferred.

$R^7$ preferably represents a univalent radical such as a hydrogen atom, a methyl, methoxy, trimethylsilyl, octyldimethylsilyl, dimethylmethoxysilyl, 1-trimethylsiloxy-propyl-3-dimethylsilyl or hydroxypropyldimethylsilyl radical, and also a multivalent radical such as $—C_2H_4—$, $—Si(Me)_2—O—Si(Me)_2O_{1/2}$, $—Si(Me)_2—CH_2—CH_2—CH_2—O—Si(Me)_2O_{1/2}$, $—Si(Me)_2—O—Si(Me)O_{2/2}$, $—Si(Me)_2—O—SiO_{3/2}$, $—Si(Me)_2—CH_2—CH_2—Si(Me)_2O_{1/2}$, or $—Si(Me)_2—CH_2—CH_2—Si(Me)O_{2/2}$, where Me is a methyl radical.

Preferred for the radicals $R^8$ are an oxygen atom and $—CH_2—$, $—C_2H_4—$, $—C_3H_6—$, $—C_4H_8—$, $—C_6H_{12}—$, $—C_6H_4—$, $—CH_2CH(CH_3)—C_6H_4—CH(CH_3)CH_2—$ and $—(CH_2)_3O—$, of which the oxygen atom, $—C_2H_4—$, $—C_3H_6—$ and $—(CH_2)_3O—$ are particularly preferred.

$R^9$ preferably represents a univalent hydrocarbon radical having from 1 to 12 carbon atoms, of which methyl, ethyl, phenyl and vinyl radicals are particularly preferred.

Preferred as units of formula (XII) are $(Me)_3SiO_{1/2}—$, $Vi(Me)_2SiO_{1/2}—$, $(Me)_2SiO_{2/2}—$, $Ph(Me)SiO_{2/2}—$, $Vi(Me)SiO_{2/2}—$ and $Me_2(MeO)SiO_{1/2}—MeSiO_{3/2}—$, of which $(Me)_3SiO_{1/2}—$, $Vi(Me)_2SiO_{1/2}—$, $(Me)_2SiO_{2/2}—$ and $Vi(Me)SiO_{2/2}—$ are particularly preferred, wherein Me is the methyl radical, Vi is the vinyl radical, and Ph is the phenyl radical.

The compounds described in the formulae (X) and (XI)/(XII) are known. Reference can be made, for example, to European published application EP 1077226 (Wacker-Chemie GmbH, filed on Aug. 13, 1999 as German application P19938338), which is incorporated by reference, in particular, the pages corresponding to pages 15 to 19 of the German application.

The bis(alkynyl)($\eta$-olefin)platinum compounds employed according to the invention are preferably bis(alkynyl)(1,5-cyclooctadiene)platinum, bis(alkynyl)(bicyclo[2.2.]hepta-2,5-diene)platinum, bis(alkynyl)(1,5-dimethyl-1,5-cyclooctadiene)platinum and bis(alkynyl)(1,6-dimethyl-1,5-cyclooctadiene)platinum complexes.

The component (D) employed according to the invention preferably comprises bis(alkynyl)($\eta$-olefin)platinum compounds of type b) or c). Most preferably, the platinum complexes employed according to the invention are bis(alkynyl)(1,5-cyclooctadiene)platinum complexes.

The optionally added component (E) preferably comprises auxiliaries, especially those which facilitate mixing of one or more of the components (A) to (D) and prevent them from separating. Examples of the optionally employed component (E) are fillers such as highly dispersed silicic acid. Preferably, no component (E) is used to prepare the composition according to the invention.

Preferred among the compositions according to the invention are those which are prepared by admixing (A) 50–90 wt % of organopolysiloxane(s) having a viscosity of from 50 to $100 \cdot 10^6$ mm$^2$/s at 25° C., where the organyl groups are alkyl and optionally alkenyl radicals, (B) 10–50 wt % of titanium oxide or zirconium oxide, (C) 0.3–5 wt % of organosilicon compound(s) comprising units of formula (I) containing basic nitrogen bound to silicon via carbon, (D) 0.05–0.5 wt % of platinum, calculated as the element, in the form of a bis(alkynyl)platinum complex which additionally includes donor ligands, (E) from 0 to 5 wt % of filler the sum of the percentages of components (A) to (E) being 100 wt %, and the wt % in each case being based on the total weight of the respective component.

Particularly preferred among the compositions according to the invention are those which are prepared by mixing (A) 50–90 wt % of organopolysiloxane(s) having a viscosity of from 50 to $100 \cdot 10^6$ mm$^2$/s at 25° C., where the organyl groups are methyl and optionally vinyl radicals, (B) 10–50 wt % of titanium oxide, (C) 0.5–5 wt % of organosilicon compound(s) comprising units of formula (I) containing basic nitrogen bound to silicon via carbon, (D) 0.05–0.5 wt % of platinum, calculated as the element, in the form of a bis(alkynyl)platinum complex which additionally includes donor ligands, the sum of the percentages of component (A) to (D) being 100 wt %, and the wt % in each case being based on the total weight of the respective component.

The compositions can be prepared via any procedures known hitherto, such as simple mixing of the individual components, for which stirrers or kneaders can customarily be used. Preferably, the components (A) to (E) employed according to the invention are mixed together at room temperature and ambient atmospheric pressure, i.e. between 900 and 1100 hPa. In many cases it may be advantageous to premix some of the components of the composition, for example component (D) with a portion of component (A), particularly in those cases where component (D) is a powder.

The components (A) to (E) may each either comprise one type of such a component or alternatively a mixture of two or more types of a particular component. The compositions can be liquid, paste-like or of high viscosity, preferably being paste-like or of high viscosity.

The compositions according to the invention are preferably employed as an additive in preparations which crosslink to form low-flammability and/or non-tracking and highly arc-resistant organopolysiloxane elastomers. The invention also relates to crosslinkable preparations which comprise the inventive compositions. The compositions are preferably admixed with crosslinkable and preferably ready-to-process preparations in amounts of from 0.3 to 3 wt %, more preferably from 0.6 to 1.0 wt %, in each case based on the total weight of the respective preparation.

The small amount of additive employed according to the invention has the advantage that coloring of the crosslinkable organopolysiloxane elastomer preparations is not adversely affected. A further advantage is that the invention also provides a route to preparing castable preparations which crosslink to form non-tracking organopolysiloxane elastomers and to preparations which crosslink to form soft, non-tracking organopolysiloxane elastomers having Shore A hardnesses below 50. The additive according to the invention also leads to low-flammability organopolysiloxane elastomers, independently of the type of the crosslinker. For example, the effect of the additive according to the invention is not impaired by peroxides during peroxidic crosslinking of the preparations crosslinkable to form organopolysiloxane elastomers.

Apart from the level of additive used according to the invention, the crosslinkable preparations according to the invention can contain the same components which may also be present in preparations which are crosslinkable to form organopolysiloxane elastomers not containing the inventive additives. These components and their quantitative ratios are already widely known to those skilled in the art.

Crosslinking of the crosslinkable preparations according to the invention can be performed in conventional manner currently known or yet to be discovered. For example, cosslinking the crosslinkable compositions can be effected in a known manner by agents which form free radicals. Examples of such agents are peroxidic compounds such as acyl peroxides, e.g. dibenzoyl peroxide, bis(4-chlorobenzoyl) peroxide and bis(2,4-dichlorobenzoyl) peroxide; alkyl peroxides and aryl peroxides such as di-t-butyl peroxide and dicumyl peroxide; perketals such as 2,5-bis(t-butylperoxy)-2,5-dimethylhexane; peresters such as diacetylperoxydicarbonate, t-butylperbenzoate and t-butylperisononanoate, t-butyl-β-hydroxyethyl peroxide; and azo compounds which form free radicals, such as azoisobutyronitrile.

Crosslinking of the crosslinkable preparations can also be effected by high-energy radiation such as α-, β- or γ-rays, or by crosslinking by the addition of Si-bound hydrogen to aliphatic carbon—carbon multiple bonds, the preparations optionally formulated as being so-called "one-component systems" or "two-component systems". Crosslinking of the crosslinkable preparations can also be effected by condensation, again presenting the options of the preparations being formulated as so-called "one-component systems" or "two-component systems".

For the purposes of the present invention and irrespective of the type of crosslinking involved, the term "organopolysiloxanes" encompasses polymeric, oligomeric and also dimeric siloxanes.

The crosslinkable preparations according to the invention are preferably those which comprise
(i) compounds containing radicals having aliphatic carbon—carbon multiple bonds,
(ii) organopolysiloxanes containing Si-bound hydrogen atoms, or, instead of or in addition to (i) and (ii),
(iii) organopolysiloxanes containing SiC-bound radicals having aliphatic carbon—carbon multiple bonds and Si-bound hydrogen atoms, and
(iv) compositions according to the invention.

The compounds (i) and (ii) or (iii) employed in the addition crosslinkable preparations according to the invention are selected in such a way that crosslinking is possible. For example, compound (i) may include at least two aliphatically unsaturated radicals, and siloxane (ii) at least three Si-bound hydrogen atoms, or compound (i) may include at least three aliphatically unsaturated radicals and siloxane (ii) at least two Si-bound hydrogen atoms, or as an alternative or in addition to compounds (i) and (ii), siloxane (iii) may be employed which includes aliphatically unsaturated radicals and Si-bound hydrogen atoms in the abovementioned ratios. The crosslinkable preparations according to the invention are preferably one-component preparations.

The compound (i) employed according to the invention can also be a silicon-free organic compound preferably having at least two aliphatically unsaturated groups, alone or in admixture with organosilicon compounds preferably having at least two aliphatically unsaturated groups. Preferably, however, the silicone preparations according to the invention comprise as component (i) an aliphatically unsaturated organosilicon compound, all the aliphatically unsaturated organosilicon compounds hitherto used in addition-crosslinking preparations being suitable for use.

The organosilicon compounds (i) employed which contain SiC-bound radicals having aliphatic carbon—carbon multiple bonds are preferably linear or branched organopolysiloxanes comprising units of the formula $$R'_{a'}R^{1'}_{b'}SiO_{(4-a'-b')/2} \tag{XIII}$$

where
R' are identical or different and represent an organic radical free from aliphatic carbon—carbon multiple bonds,
R' are identical or different and represent a univalent, optionally substituted, SiC-bound hydrocarbon radical having an aliphatic carbon—carbon multiple bond,
a' is 0, 1, 2 or 3, and
b' is 0, 1 or 2,
with the proviso that the sum a'+b' is less than or equal to 3, and on average at least 2 radicals $R^{1'}$ are present per molecule.

The radical R' can represent uni- or multivalent radicals, when the multivalent radicals, such as divalent, trivalent and tetravalent radicals, then link together a plurality of siloxy units, e.g. two, three or four units, of formula (XIII). In such cases, the radical R' is still univalent with respect to a single silicon atom. R' encompasses but is not limited to the univalent radicals —F, —Cl, —Br, —OR$^6$, —CN, —SCN, —NCO and SiC-bound, optionally substituted hydrocarbon radicals which can be interspersed with oxygen atoms or the group —C(O)—, and divalent radicals bound to Si on both sides according to formula (XIII).

The radical R' is preferably a univalent SiC-bound, optionally substituted hydrocarbon radical free from aliphatic carbon—carbon multiple bonds and having from 1 to 18 carbon atoms, more preferably a univalent SiC-bound, optionally substituted hydrocarbon radical free from aliphatic carbon—carbon multiple bonds and having from 1 to 6 carbon atoms, most preferably the methyl or phenyl radicals.

The radical $R^{1'}$ preferably represents alkenyl and alkynyl groups having from 2 to 16 carbon atoms, such as the vinyl, allyl, methallyl, 1-propenyl, 5-hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl and styryl radicals, the use of vinyl, allyl and hexenyl radicals being particularly preferred.

Particularly preferred as component (i) is the use of vinyl-functional, essentially linear polydiorganosiloxanes having a viscosity of from 0.01 to 500,000 Pass, particularly preferably from 0.1 to 100,000 Pa.s, in each case at 25° C.

Suitable as the organosilicon compound (ii) are all those hydrogen-functional organosilicon compounds which have hitherto been employed in addition-crosslinkable preparations. The organopolysiloxanes (ii) used which contain Si-bound hydrogen atoms are preferably linear, cyclic or branched organopolysiloxanes composed of units of the formula

$$R'_{c'}H_dSiO_{(4-c'-d)/2} \quad (XIV)$$

where

R' are identical or different and has the abovementioned meaning, c is 0, 1, 2 or 3, and d is 0, 1 or 2, with the proviso that the sum of c'+d is smaller than or equal to 3 and on average at least two Si-bound hydrogen atoms per molecule are present.

Preferably, the organopolysiloxane (ii) employed according to the invention contains Si-bound hydrogen in the range of from 0.04 to 1.7 percent by weight, based on the total weight of the organopolysiloxane (ii).

Particularly preferred as component (ii) are low molecular weight, SiH-functional compounds such as tetrakis(dimethylsiloxy)silane and tetramethylcyclo-tetrasiloxane, and higher molecular weight, SiH-containing siloxanes such as poly(hydrogenmethyl)siloxane and poly(dimethylhydrogenmethyl)siloxane having a viscosity at 25° C. of from 10 to 10,000 mPa.s, or analogous SiH-containing compounds, in which some of the methyl groups are replaced by 3,3,3-trifluoropropyl or phenyl groups.

Component (ii) is preferably present in such an amount in the crosslinkable silicone overall preparations according to the invention that the molar ratio of SiH groups to aliphatically unsaturated groups is from 0.1 to 20, more preferably between 1.0 and 5.0.

Instead of or in addition to components (i) and (ii), the crosslinkable preparations according to the invention can comprise organopolysiloxanes (iii) containing aliphatic carbon—carbon multiple bonds and Si-bound hydrogen atoms, but this is not preferred. Thus, the addition-crosslinkable components must include a combination of components (i), (ii), and (iii) which provide a crosslinkable composition containing both unsaturated hydrocarbon-functional and SiH-functional components.

The components (i), (ii) and (iii) of the crosslinkable preparations according to the invention are commercially available products or described in detail in the abovementioned publications EP-A 982 370, EP-A 994 159 and in the European published application EP 1077226 (Wacker-Chemie GmbH, filed on Aug. 13, 1999 as German application P19938338), this being incorporated by reference.

Addition-crosslinkable preparations are known to be catalyzed by platinum compounds or platinum complexes. The amount of platinum catalyst employed depends on the desired crosslinking rate and the specific use and on economic considerations. The amount of platinum included in the preparations according to the invention via component (iv) is generally sufficient for the desired crosslinking reaction. If desired, however, additional platinum catalyst can be added, particular preference then being given to platinum complexes selected from the above-described formulae (III) to (XI)/(XII).

In addition to the components (i) to (iv), the curable preparations according to the invention can contain all further substances which have hitherto been used to prepare addition-crosslinkable preparations.

Examples of reinforcing fillers which can be used as component (v) in the preparations according to the invention include famed or precipitated silicic acid having BET surface areas of at least 50 m²/g and carbon blacks and activated carbons such as furnace black and acetylene black, of which fumed and precipitated silicic acids having BET surface areas of at least 50 m²/g are preferred. The aforementioned silicic acid fillers may be of hydrophilic character or may have been hydrophobicized via known procedures. If hydrophilic fillers are blended in, it is generally necessary to add a hydrophobicizer. The level of actively reinforcing filler (v) in the crosslinkable preparation according to the invention is in the range of from 0 to 70 wt %, preferably from 0 to 50 wt %.

The crosslinkable silicone rubber preparation according to the invention can optionally, as component (vi), comprise further additives in a proportion of up to 70 wt %, preferably from 0.0001 to 40 wt %. These additives can e.g. be inactive fillers, resinous polyorganosiloxanes which differ from the siloxanes (i), (ii) and (iii), dispersing aids, solvents, adhesion promoters, pigments, dyes, plasticizers, organic polymers, heat stabilizers, etc. These include additives such as quartz powder, diatomaceous earth, clays, chalk, lithopones, carbon blacks, graphite, metal oxides, metal carbonates, metal sulfates, metal salts of carboxylic acids, metal dusts, fibers such as glass fibers, plastic fibers, powdered plastic, dyes, pigments, etc.

Additives (vii) which serve to control the processing time, onset temperature and crosslinking rate of the preparations according to the invention may also be present. These inhibitors and stabilizers are very well known in the field of addition-crosslinking preparations. Examples of customary inhibitors are acetylenic alcohols such as 1-ethynyl-1-cylcohexanol, 2-methyl-3-butyn-2-ol and 3,5-dimethyl-1-hexyn-3-ol, 3-methyl-1-dodecyn-3-ol, poly(methylvinylcyclosiloxanes), such as 1,3,5,7-tetravinyltetramethyltetracyclosiloxane, low molecular weight silicone oils containing methylvinylSio$_{2/2}$ groups and/or R$_2$vinylSiO$_{1/2}$ terminal groups such as divinyltetramethyldisiloxane, tetravinyldimethyldisiloxane, trialkylcyanurates, maleates such as diallyl maleate, dimethyl maleate and diethyl maleate, fumarates such as diallyl fumarate and diethyl fumarate, organic hydroperoxides such as cumene hydroperoxide, t-butyl hydroperoxide and pinane hydroperoxide, organic peroxides, organic sulfoxides, organic amines, diamines and amides, phosphanes and phosphites, nitrites, triazoles, diaziridines and oximes. The effect of these inhibitor additives (vii) depends on their chemical structure and must therefore be determined individually. The inhibitor level of the crosslinkable preparations according to the invention is preferably from 0 to 50,000 ppm, particularly preferably from 20 to 5000 ppm, especially from 200 to 2000 ppm.

The preparation of the curable organopolysiloxane preparations according to the invention can take place according to known procedures, for example by uniform mixing of individual components, in any sequential order. Alternatively, however, a ready-to-use crosslinkable preparation comprising components (i), (ii) and/or (iii) and platinum catalyst and optionally further components can be mixed with the additive according to the invention.

The components (i) to (vii) employed according to the invention can in each case comprise a single type of such a component or alternatively a mixture of at least two different types of such a component.

The inventive preparations which can be crosslinked by the addition of Si-bound hydrogen to aliphatic multiple bonds can be allowed to crosslink under the same conditions as the preparations known hitherto which are crosslinkable by a hydrosilylation reaction. Preferably crosslinking takes place at temperatures of from 100 to 220° C., more preferably from 130 to 190° C., and at a pressure of from 900 to 1,100 hPa. Alternatively, however, higher pressures can be applied, for example from 50,000 to 500,000 hPa, in pressure vulcanization. Crosslinking can also be effected photochemically by means of energy-rich radiation such as short-wavelength light and UV light, or by means of a combination of thermal and photochemical excitation.

The crosslinkable organopolysiloxane preparations according to the invention are most preferably one-component addition-crosslinkable, high-viscosity preparations.

The present invention also relates to molded articles prepared by crosslinking the preparations according to the invention.

The crosslinkable preparations according to the invention and the crosslinked products produced therefrom according to the invention can be employed for all those purposes for which organopolysiloxane preparations, which can be crosslinked to produce elastomers, or elastomers themselves have been employed hitherto, in particular for the fabrication of electrical installation materials, medium- and high-voltage insulators, cable pot heads, cable junction boxes, anode caps for television cathode ray tubes, and compression moldings and extruded articles for the avionics industry.

The inventive crosslinkable preparations have the advantage that they can be produced by a simple method, and consequently in an economic manner. The crosslinkable preparations have the further advantage that, as a one-component formulation, they have good storage stability at 25° C. and ambient pressure and will rapidly crosslink only at elevated temperature.

The inventive crosslinkable silicone preparations have a yet further advantage that for two-component formulations, after mixing of the two components, a crosslinkable silicone preparation results whose processability is maintained over a prolonged period at 25° C. and ambient pressure (extremely long pot life) yet which rapidly crosslinks at elevated temperature.

The compositions according to the invention also have the advantage that, owing to the low metal oxide content, they allow soft, colorable elastomers to be produced which have very good mechanical properties.

The crosslinkable preparations according to the invention are also advantageous in that the hydrosilylation reaction does not slow down as the reaction proceeds, and that the hydrosilylation reaction rate does not decrease even after prolonged storage at room temperature.

In the examples described below, parts and percentages are by weight throughout, unless otherwise specified. Unless otherwise specified, the following examples are carried out at a pressure of the ambient atmosphere, i.e. at about 1,000 hPa, and at room temperature, i.e. at about 20° C., or at a temperature which is established when the reactants are combined at room temperature without additional heating or cooling.

Hereinafter, all the viscosities specified relate to a temperature of 25° C.

COD represents cylcoocta-1,5-diene, p-means para-substitution on the aromatic ring, and Me represents a methyl radical.

Preparation of the Platinum Complex 1

A suspension of 0.50 g [PtCl$_2$(COD)] in 20 ml of methanol was cooled under nitrogen to −20° C. A freshly prepared solution of 0.77 g of (4-trimethylsilylphenylethynyl)trimethylsilane (prepared according to J. Chem. Soc. (C) 1967, 1364–1366) and sodium methanolate (prepared from 61.5 mg of sodium and 15 ml of methanol) was then slowly added dropwise. After about 20 minutes, the mixture was warmed to room temperature, the precipitate was removed by filteration, and washed five times with acetone. This afforded 0.78 g of a platinum complex of the following formula:

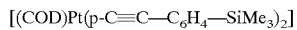

$[(COD)Pt(p-C{\equiv}C-C_6H_4-SiMe_3)_2]$

EXAMPLE 1

Preparation of the Additive 3.6 parts of the above-prepared platinum complex 1 are mixed with 236 parts of a dimethylpolysiloxane terminated by dimethylvinyl groups and having a viscosity of 1000 mm$^2$/s (premix). A further 100 parts of the above-described dimethylpolysiloxane terminated by dimethylvinyl groups and 160 parts of fumed titanium dioxide generated in the gas phase and having a specific surface area according to BET of about 50 m$^2$/g are then added in an agitator. After homogeneous mixing at 23° C., the mixture is admixed with 7 parts of N-(2-aminoethyl)-3-amino-n-propyltrimethoxysilane. The mixture is then homogenized with vigorous stirring for 1 hour at 23° C.

a) Preparation of a Rubber Master Batch 100 parts of poly(dinethyl/vinyhnethyl)siloxane terminally blocked with vinyldimethylsiloxy groups, containing 0.031 wt % of vinyl units, and having a viscosity of about 15·10$^6$ mPa.s are kneaded together for an hour at 150° C. with 2.8 parts of α,ω-dihydroxypolydimethylsiloxane having a viscosity of about 40 mPa.s, 9 parts of fumed silicic acid having a specific surface area according to BET of 200 m$^2$/g and 29 parts of a hydrophobic, fumed silicic acid having a specific surface area according to BET of 300 m$^2$/g and a carbon content of 3.9%.

b) Preparation of a Catalyst Batch

On a roll mill, 0.085 part of the above-prepared platinum complex 1 was admixed homogeneously into 100 parts of the master batch prepared above under a), the catalyst batch thus obtained containing 255 ppm of Pt.

c) Preparing the Crosslinkable Preparation 100 parts of the master batch prepared above under a) were admixed, on a roll mill, with 2 parts of the catalyst batch prepared above under b), 0.1 part of ethynylcyclohexanol, 2 g of Si—H crosslinker which is a mixed polymer composed of dimethylsiloxy, methylhydrogensiloxy and trimethylsiloxy units and having a viscosity of 300 mPa.s and a level of Si-bound hydrogen of 0.43 wt %, and with 0.8 part of the above-described additive.

Aliquots of each of the preparation thus prepared were stored at 23° C. and 50° C. respectively for the purpose of a quantitative determination of storability, in which the time required to double the initial viscosity was determined.

The thermal curing properties of the preparation thus produced, e.g. the onset temperature, were measured by means of a Goettfert elastograph.

In addition, slabs having a thickness of 2 mm and 6 mm were fabricated from the preparation by vulcanization at 165° C. The slabs thus obtained are tempered after vulcanization for 4 hours at 200° C. in a circulating oven.

A portion of the slabs is used to determine the flammability, the degree of flame resistance in each case being represented by the LOI (Limited Oxygen Index) value which is determined in accordance with ASTM-D 2863-70. The higher the LOI value, the higher is the extent of flame resistance. Also determined are the tracking resistance according to DIN 57303 and the arc resistance according to DIN 57441. The weight loss occurring after the tracking resistance has been established is likewise determined. In addition, mechanical properties, Shore A hardness according to DIN 53505, percentage elongation at break and tensile strength at break according to DIN 53504 Si and the resistance to tear propagation according to ASTM D 624 B are determined on the tempered slabs.

The results are shown in table 1.

Comparative Example 1 (C1)

The procedure described in example 1 is repeated, except that no additive is added to prepare the crosslinkable preparation. The results are shown in table 1.

Comparative Example 2 (C2)
Preparation of a Platinum-containing Reference Mixture A mixture of 10 parts of $H_2PtCl_6.6H_2O$, 20 parts of 1,3-divinyl-1,1,3,3-tetramethyldisiloxane and 50 parts of ethanol was admixed with 20 parts of sodium bicarbonate. The mixture was refluxed with stirring for 30 minutes, then allowed to stand for 15 hours and then filtered. The volatile components were distilled off from the filtrate at about 16 hPa (abs.). Obtained as the residue were 17 parts of a liquid which was dissolved in benzene. The solution was filtered and the benzene was distilled off from the filtrate. The residue was mixed with dimnethylpolysiloxane having dimethylvinylsiloxane units as terminal units and having a viscosity of 1400 mpa.s as a diluent in such an amount that the mixture contains 1 wt % of platinum, calculated as the element.

The procedure described in example 1 is repeated, except that instead of the about 240 parts in total of the premix in the additive described, 120 parts of the above-described platinum-containing reference mixture are used. In addition, 120 parts of a dimethylvinyl-terminated dimethylpolysiloxane having a viscosity of about 1000 $mm^2/s$ are admixed as a diluent.

The results are shown in table 1.

Comparative Example 3 (C3)

The procedure described in example 1 is repeated, except that no amino-functional silane is used to prepare the additive. The results are shown in table 1.

TABLE 1

| Example | 1 | C1 | C2 | C3 |
|---|---|---|---|---|
| Storage at 23° C. | >4 months | >4 months | <5 h | <24 h |
| Storage at 50° C. | About 20 d | About 20 d | — | — |
| Onset temperature | 139° C. | 137° C. | 93° C. | 132° C. |
| Tracking resistance | 4.5 kV | 2.5 kV (failed) | 3.5 kV | 2.5 kV |
| Weight loss | 0.2% | 1.4% | 1.0% | 1.5% |
| Arc resistance | 352 s | 265 s | 362 s | 144 s |
| LOI | 27% | 24% | 26% | 23% |
| Hardness [Shore A] | 37 | 36 | 46 | 39 |
| % elongation at break [%] | 1220 | 1260 | 1170 | 1210 |
| Tensile strength at break [N/mm²] | 6.5 | 6.8 | 6.7 | 7.3 |
| Resistance to tear propagation | 28 N/mm | 28 N/mm | 25 N/mm | 25 N/mm |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more" unless indicated to the contrary or clearly dictated by grammatical construction.

What is claimed is:

1. A composition comprising an admixture of, or a reaction product thereof, of components
    (A) 50–90 wt % of organopolysiloxane(s) having a viscosity of from 50 to $100 \cdot 10^6$ $mm^2/s$ at 25° C.,
    (B) 10–50 wt % of one or more of titanium oxide, zirconium dioxide, zinc oxide, cerium(III) or cerium (IV) oxide,
    (C) 0.3–5 wt % of organosilicon compound(s) containing basic nitrogen bound to silicon via carbon,
    (D) 0.05–0.5 wt % of platinum, calculated as the element, in the form of a bis(alkynyl)platinum complex additionally including donor ligands, and
    (E) from 0 to 5 wt % of further components, the sum of the weight percentages of components (A) to (E) being 100 wt %, and the wt % in each case being based on the total weight of the respective component.

2. The composition of claim 1 which is free of component (E).

3. The composition of claim 1, wherein component (B) is titanium dioxide, zirconium dioxide, or mixtures thereof.

4. The composition of claim 1, wherein component (C) comprises an organosilane containing basic nitrogen bound to silicon via carbon.

5. The composition of claim 1, wherein component (D) comprises a bis(alkynyl)(η-olefin)platinum compounds of type b) or c):
    b) bis(alkynyl)(η-olefin)platinum compounds selected from the group consisting of

(VI)

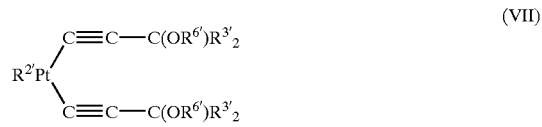

(VII)

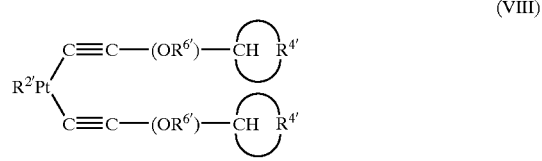

(VIII)

and

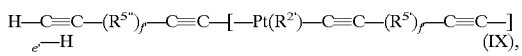

(IX), where
R²' individually represent an optionally substituted diene which is linked to platinum via at least one π-bond, an unbranched or branched chain having from 4 to 12 carbon atoms, or a cyclic ring having from 6 to 18 carbon atoms,
R³' are identical or different and represent a hydrogen atom, halogen atom, or a univalent hydrocarbon radical optionally substituted by halogen atom(s) or cyano radical(s) and having from 1 to 24 carbon atoms,
R⁴' represents identical or different divalent, optionally substituted hydrocarbon radicals having from 1 to 24 carbon atoms,
R⁵' are identical or different and represent divalent, optionally substituted hydrocarbon radicals having from 1 to 12 carbon atoms, silane radicals, or siloxane radicals, R$^{6'}$ are identical or different and are a hydrogen atom or a univalent hydrocarbon radical having from 1 to 20 carbon atoms, e' represents an integer greater than or equal to 1, and f' is 0 or 1, c) bis(alkynyl)(η-olefin)platinum compounds, selected from the group consisting of compounds of formula (X)

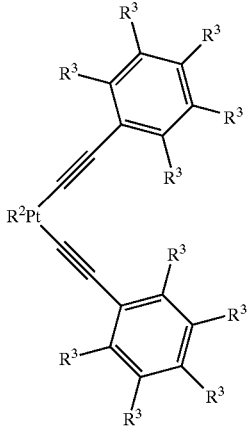

and/or oligomeric or polymeric compounds composed of structural units of the general formula (XI)

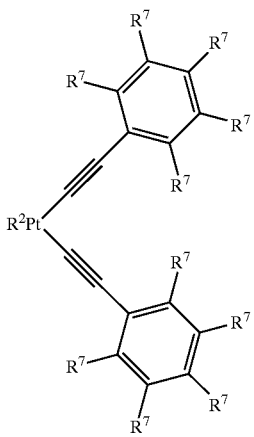

and optionally structural units of the general formula $$R^9{}_r SiO_{(4-r)/2} \qquad (XII)$$

where

R$^2$ represents an optionally substituted diene which is bound to platinum via at least one η-bond and constitutes an unbranched or branched chain having from 4 to 18 carbon atoms or a cyclic ring having from 6 to 28 carbon atoms, R$^3$ are identical or different and represent a hydrogen atom, a halogen atom, —SiR$^4{}_3$, —OR$^6$ or a univalent, optionally substituted hydrocarbon radical having from 1 to 24 carbon atoms, with the proviso that in the compounds of formula (X) at least one radical R$^3$ is —SiR$^4{}_3$, R$^4$ are identical or different and represent hydrogen, a halogen atom, —OR$^6$ or a univalent, optionally substituted hydrocarbon radical having from 1 to 24 carbon atoms, R$^6$ identical or different and represent a hydrogen atom, —SiR$^4{}_3$ or a univalent, optionally substituted hydrocarbon radical having from 1 to 20 carbon atoms, R$^7$ are identical or different and represent a hydrogen atom, a halogen atom, —SiR$^4{}_3$, —SiR$^4{}_{(3-t)}$[R$^8$SiR$^9{}_s$O$_{(3-s)/2}]_t$, —OR$^6$ or a univalent, optionally substituted hydrocarbon radical having from 1 to 24 carbon atoms, with the proviso that in formula (VI) at least one radical R$^7$ has the meaning —SiR$^4{}_{(3-t)}$[R$^8$SiR$^9{}_s$O$_{(3-s)/2}]_t$, R$^8$ are identical or different and represent oxygen or a divalent, optionally substituted hydrocarbon radical having from 1 to 24 carbon atoms, which can optionally be bound to silicon via an oxygen atom, R$^9$ are identical or different and represent hydrogen or an organic radical, r is 0, 1, 2 or 3, s is 0, 1, 2 or 3, and t is 1,2 or 3.

6. The composition of claim 1, comprising (A) 50–90 wt % of organopolysiloxane(s) having a viscosity of from 50 to 100·10$^6$ mm$^2$/s at 25° C., where the organyl groups are methyl and optionally vinyl radicals, (B) 10–50 wt % of titanium oxide, (C) 0.5–5 wt % of organosilicon compound(s) comprising units of formula (I)

$$Y_a R_b (OR^1)_c SiO_{(4-a-b-c)/2} \qquad (I),$$

where

R are identical or different and represent univalent hydrocarbon radicals having from 1 to 8 carbon atoms per radical, R$^1$ are identical or different and represent alkyl groups having from 1 to 4 carbon atoms per radical, Y are identical or different and represent univalent SiC-bound organic radicals containing basic nitrogen, a is 0, 1, 2 or 3, b is 0, 1, 2 or 3, c is 0, 1, 2 or 3, with the proviso that the sum a+b+c≦4, and that the organosilicon compound comprises at least one unit where a differs from 0 and contains at most 10 silicon atoms;

(D) 0.05–0.5 wt % of platinum, calculated as the element, in the form of a bis(alkynyl)platinum complex which additionally includes donor ligands.

7. A crosslinkable organosilicon preparation comprising a composition of claim 1 as an additive.

8. A crosslinkable preparation comprising from 0.3 to 3 wt % of the composition of claim 1 based on the total weight of the preparation.

9. A crosslinkable preparation comprising from 0.3 to 3 wt % of the composition of claim 6 based on the total weight of the preparation.

10. The crosslinkable preparation of claim 7, comprising (i) compound(s) containing radicals having aliphatic carbon—carbon multiple bonds, (ii) organopolysiloxanes containing Si-bound hydrogen atoms, or, instead of or in addition to (i) and (ii), (iii) organopolysiloxanes containing SiC-bound radicals having aliphatic carbon—carbon multiple bonds and Si-bound hydrogen atoms; and (iv) a composition comprising (A) 50–90 wt % of organopolysiloxane(s) having a viscosity of from 50 to 100·10$^6$ mm$^2$/s at 25° C., (B) 10–50 wt % of one or more of titanium oxide, zirconium dioxide, zinc oxide, cerium(III) or cerium (IV) oxide,
(C) 0.3–5 wt % of organosilicon compound(s) containing basic nitrogen bound to silicon via carbon,
(D) 0.05–0.5 wt % of platinum, calculated as the element, in the form of a bis(alkynyl)platinum complex additionally including donor ligands, and
(E) from 0 to 5 wt % of further components, the sum of the weight percentages of components (A) to (E) being 100 wt %, and the wt % in each case being based on the total weight of the respective component.

11. The crosslinkable preparation of claim 7, comprising
(i) compound(s) containing radicals having aliphatic carbon—carbon multiple bonds,
(ii) organopolysiloxanes containing Si-bound hydrogen atoms, or, instead of or in addition to (i) and (ii),
(iii) organopolysiloxanes containing SiC-bound radicals having aliphatic carbon—carbon multiple bonds and Si-bound hydrogen atoms; and
(iv) a composition comprising
(A) 50–90 wt % of organopolysiloxane(s) having a viscosity of from 50 to 100·10$_6$ mm$^2$/s at 25° C., where the organyl groups are methyl and optionally vinyl radicals,
(B) 10–50 wt % of titanium oxide,
(C) 0.5–5 wt % of organosilicon compound(s) comprising units of formula (I) containing basic nitrogen bound to silicon via carbon,

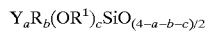   (I), where
R are identical or different and represent univalent hydrocarbon radicals having from 1 to 8 carbon atoms per radical,
R$^1$ are identical or different and represent alkyl groups having from 1 to 4 carbon atoms per radical,
Y are identical or different and represent univalent SiC-bound organic radicals containing basic nitrogen,
a is 0, 1, 2 or 3,
b is 0, 1, 2 or 3,
c is 0, 1, 2 or 3, with the proviso that the sum a+b+c≦4, and that the organosilicon compound comprises at least one unit where it differs from 0 and contains at most 10 silicon atoms; and
(D) 0.05–0.5 wt % of platinum, calculated as the element, in the form of a bis(alkynyl)platinum complex which additionally includes donor ligands.

12. A molded article prepared by crosslinking the preparation of claim 7.

13. A molded article prepared by crosslinking the preparation of claim 7.

14. A molded article prepared by crosslinking the preparation of claim 8.

15. A molded article prepared by crosslinking the preparation of claim 10.

16. A molded article prepared by crosslinking the preparation of claim 11.

* * * * *